(12) United States Patent
Hains

(10) Patent No.: US 7,639,400 B2
(45) Date of Patent: Dec. 29, 2009

(54) GLOSSMARK IMAGE SIMULATION WITH APPLICATION OF BACKGROUND MODIFIED GLOSS EFFECT IMAGE

(75) Inventor: Charles Michael Hains, Altadena, CA (US)

(73) Assignee: Xerox Corporation, Norwalk, CT (US)

(*) Notice: Subject to any disclaimer, the term of this patent is extended or adjusted under 35 U.S.C. 154(b) by 490 days.

(21) Appl. No.: 11/706,022

(22) Filed: Feb. 13, 2007

(65) Prior Publication Data
US 2008/0193860 A1 Aug. 14, 2008

(51) Int. Cl.
H04N 1/387 (2006.01)
H04N 1/407 (2006.01)
G06T 5/50 (2006.01)
B41M 3/10 (2006.01)

(52) U.S. Cl. ............... 358/3.06; 358/3.27; 358/3.28
(58) Field of Classification Search .......... 358/1.9, 358/3.06, 3.09, 3.13–3.22, 3.26–3.28, 533–536; 382/270, 254, 266, 274, 275; 283/113
See application file for complete search history.

(56) References Cited

U.S. PATENT DOCUMENTS

| 4,175,776 | A | 11/1979 | Ranauro |
| 4,522,429 | A | 6/1985 | Gardner et al. |
| 5,734,752 | A | 3/1998 | Knox |
| 6,108,512 | A | 8/2000 | Hanna |
| 6,983,081 | B2 * | 1/2006 | Chen ............... 382/284 |
| 7,092,128 | B2 | 8/2006 | Wang et al. |
| 7,126,721 | B2 | 10/2006 | Wang et al. |
| 7,148,999 | B2 | 12/2006 | Xu et al. |
| 7,391,537 | B2 * | 6/2008 | Eschbach et al. ............ 358/3.06 |
| 2003/0231349 | A1 | 12/2003 | Wang et al. |
| 2004/0000786 | A1 | 1/2004 | Xu et al. |
| 2004/0114160 | A1 | 6/2004 | Wang et al. |
| 2005/0128523 | A1 | 6/2005 | Liu et al. |
| 2005/0128524 | A1 | 6/2005 | Liu et al. |
| 2005/0286083 | A1 | 12/2005 | Wang et al. |
| 2006/0018526 | A1 * | 1/2006 | Avinash ............ 382/132 |
| 2006/0044617 | A1 | 3/2006 | Wang et al. |
| 2006/0072159 | A1 | 4/2006 | Eschbach et al. |
| 2006/0127117 | A1 | 6/2006 | Eschbach et al. |

FOREIGN PATENT DOCUMENTS

EP 1 367 810 A2 12/2003
WO WO 2006/099897 A1 9/2006

* cited by examiner

Primary Examiner—Scott A Rogers
(74) Attorney, Agent, or Firm—Fay Sharpe, LLP (57) ABSTRACT

A method of simulating a differential gloss image includes providing a background and a gloss effect image. The gloss effect image is configured for controlling the selective application of first and second halftones to the background image for creation of a differential gloss image when the background image is printed. A mask based on the background image is formed in which regions of mid-tone gray level are accentuated. An edge effect filter may be applied to the gloss effect image to form a filtered gloss effect image. The mask is applied to the filtered gloss effect image to generate a background modified filtered gloss effect image. The background modified filtered gloss effect image is applied to the background image to generate a representation which simulates the differential gloss image.

21 Claims, 7 Drawing Sheets

| 0 | 0 | 1 | 1 | 1 | 0 | 0 |
|---|---|---|---|---|---|---|
| 0 | 1 | 1 | 1 | 1 | 1 | 0 |
| 1 | 1 | 1 | 1 | 1 | 1 | 1 |
| 1 | 1 | 1 | -36 | 1 | 1 | 1 |
| 1 | 1 | 1 | 1 | 1 | 1 | 1 |
| 0 | 1 | 1 | 1 | 1 | 1 | 0 |
| 0 | 0 | 1 | 1 | 1 | 0 | 0 |

*FIG. 8*

GLOSSMARK IMAGE SIMULATION WITH APPLICATION OF BACKGROUND MODIFIED GLOSS EFFECT IMAGE

BACKGROUND

The exemplary embodiment relates generally to the simulation of gloss inherent in the hardcopy of image data, be it pictorial or text. More particularly, it relates to the generation of a simulated differential gloss image for display or printing in which the impact on the background image is controlled.

Digital watermarks have been applied to images for a variety of purposes, including verification of authenticity of documents, providing information, and prevention of copying. Many of the techniques for generating such watermarks involve adding image data or modifying image data in an existing image prior to printing the image. In other techniques, selective application of a clear toner to a rendered image is used to create a watermark.

More recently, differential gloss (Glossmark™) technology has been used for the generation of digital watermarks. The technology allows a digital watermark to be introduced without modification of the original image data or the use of special marking materials or substrates. Rather, the technique creates a differential gloss image which can be discerned by a human reader holding the printed paper at an angle but which cannot be detected by a scanner or copier. These devices are restricted to reading the image at a fixed angle to the paper, which is generally selected so as to minimize the impact of specular reflection. The differential gloss image is created by selective use of two different halftone screens which create two different gloss levels in halftone outputs.

In halftone printing, a contone image (an image in which gray levels are substantially continuously variable) is converted to a halftone image by applying a screen. In a dot halftone system, the screen is essentially a grid in which the cells are either on or off, depending on the gray level. Each cell has a different gray level at which it is turned on. The screen determines how the dot cluster grows with increasing gray level. In conventional halftone dot screens, the cluster grows generally radially outward from a single cell or cells as gray level increases. In differential gloss techniques, two halftone screens having different anisotropic structure orientations, which may be provided by differences in dot growth patterns and/or screen orientations, are used. By toggling between the two halftone screens in generating the halftone image, differences in gloss are apparent when the rendered image is viewed at an angle.

Because the differential gloss watermark is generated using halftone screens, the watermark is not visible on a computer-screen or on a sub-sampled lower-resolution image. However, it is often advantageous for a user to be able to select the location of the differential gloss watermark with respect to the background image. Techniques have been developed for replacing the actual screen invisible differential gloss watermark with a screen visible image while simultaneously maintaining the integrity of the mark.

There are two stages in the creation of a differential gloss image where a simulation of the differential gloss watermark is of interest. First in the graphics interface during creation of the watermark, a preview image is generated for the computer screen in order to indicate how a gloss effect image, which provides the watermark, lines up spatially with the background image. In one method, a reduced-contrast version of the gloss effect image is added to the background image which would then indicate placement. A user can indicate the relative position of the gloss effect image via a user interface, which displays the gloss effect image superimposed upon the background image.

Second, when a reference to the created differential gloss image is placed into an applications document, a low-resolution placeholder image containing the reference is utilized. The placeholder image allows proofing for size, color, and placement both in the applications program and on simple prints from a conventional printer which is not enabled for creation of differential gloss images.

Existing methods have not been able to show the true colors of the background image as it would be seen straight-on, without the gloss effects, while at the same time simulating the gloss variation as it would appear with off-axis illumination. In particular, the existing techniques for simulating the placement of a differential gloss mark result in a marked alteration of the true colors of large portions of the background image. Further, there is no simulation or indication of the strength of the gloss effect. The differential gloss in a differential gloss print is less noticeable in some areas of a printed image, such as in high-light and deep-shadow regions. This is because the anisotropy in the halftone structures, which creates the differential gloss effect, is apparent at intermediate gray levels and diminishes rapidly to zero at either end of the grayscale. However, in the prior simulation technique, the added gloss effect image shows up equally strongly throughout the background image including in those highlight and deep-shadow regions where the differential gloss effect is very weak in the actual GlossMark prints.

INCORPORATION BY REFERENCE

Cross reference is made to the following applications, the disclosures of each of which are incorporated by reference herein in their entireties:

U.S. Pat. No. 7,092,128, issued Aug. 15, 2006, (U.S. Pub. No. 20040156078), entitled APPLICATION OF GLOSSMARKS FOR GRAPHICS ENHANCEMENT, by Shen-Ge Wang, et al., relates to a method for providing a designer with the tools for the manipulation of differential gloss in halftoned images. A special mask layer is provided for the rendering of desired Glossmark image data. The desired Glossmark image data is used to select between two halftones with anisotropic structure characteristics which are significantly different in orientation while remaining identical in density. This selection is made for each corresponding portion of primary image data. In this way, a halftone image of the primary image is generated with Glossmarks embedded therein which will display differential gloss without the need for special toners or paper.

U.S. Pat. No. 7,126,721, issued Oct. 24, 2006 (U.S. Pub. No. 20040001233), entitled PROTECTING PRINTED ITEMS INTENDED FOR PUBLIC EXCHANGE WITH GLOSSMARKS, by Shen-Ge Wang, et al., relates to the protection of printed items intended for public exchange having important informational indicia provided therein. The print items are protected from tampering by providing an informational indicia image as a Glossmark. By selectively applying halftones with anisotropic structure characteristics which are significantly different in orientation while remaining identical in density to render information indicia, a Glossmark™ image is produced of the information indicia. Such an information indicia Glossmark™ image when provided in print item image helps protect that print item image from tampering.

U.S. Pat. No. 7,148,999, issued Dec. 12, 2006 (Pub. No. 20040000786), entitled VARIABLE GLOSSMARK, by Beilei Xu, et al. relates to the segmentation of an image into a main area and an image segment for variable Glossmark data. By selectively applying halftones with anisotropic structure characteristics which are significantly different in orientation while remaining identical in density to the image segment, a variable glossmark may be superimposed within an image with reduced processing and storage requirements.

U.S. Pub. No. 20030231349, published Dec. 18, 2003, entitled HALFTONE IMAGE GLOSS CONTROL FOR GLOSSMARKS, by Shen-Ge Wang, et al. relates to the manipulation of differential gloss as may be inherent in halftoned images. By selectively applying halftones with anisotropic structure characteristics which are significantly different in orientation while remaining identical in density, a gloss image may be superimposed within an image without the need for special toners or paper.

U.S. Pub. No. 20040114160, published Jun. 17, 2004, entitled TAG CONTROL FOR RUNTIME GLOSSMARKS, by Shen-Ge Wang, et al., relates to the manipulation of differential gloss as may be inherent in halftoned images by utilization of tags. A method for the manipulation of the differential gloss in a halftone image is disclosed which includes receiving primary image data, receiving desired glossmarking image data, and tagging at least some portion of the primary image data, as directed by the desired glossmarking image with a first tag setting. By selectively applying halftones with anisotropic structure characteristics, which are significantly different in orientation while remaining identical in density, as directed by tag settings, a gloss image may be superimposed within an image without the need for special toners or paper.

U.S. Pub. No. 20050128523, published Jun. 16, 2005, entitled REDUCTION OF DIFFERENTIAL GLOSS, by Chu-Heng Liu, et al., discloses a method for reduction of differential gloss as found in hardcopy image prints. The method includes selecting a first halftone having a high apparent gloss characteristic, selecting a second halftone having a low apparent gloss characteristic while retaining an identical matching density characteristic to the first selected halftone, applying the first halftone to at least some portion of the halftone image, and applying the second halftone to the remaining portion of the halftone image.

U.S. Pub. No. 20050128524 published Jun. 16, 2005, entitled ENHANCEMENT OF GLOSSMARK IMAGES AT LOW AND HIGH DENSITIES, by Chu-Heng Liu, et al., discloses a method for the manipulation of the differential gloss in a halftone image. The method includes selecting a first halftone having a first anisotropic structure orientation, selecting a second halftone having a second anisotropic structure orientation different from that of the first halftone, applying the first halftone to at least some portion of the halftone image, applying the second halftone to the remaining portion of the halftone image, and applying a clear toner to some portion of a hardcopy output of the resulting halftone image.

U.S. Pub. No. 20050286083, published Dec. 29, 2005, entitled GLOSSMARK IMAGES WITH CLEAR TONER, by Shen-Ge Wang, et al., relates to the creation of differential gloss images in clear toner by the manipulation of halftones employed prior to the depositing of the clear toner layer upon a substrate. By selectively applying halftones with anisotropic structure characteristics which are significantly different in orientation although remaining identical in density, a differential gloss image may be superimposed within even clear toner as applied to paper. Further, this technique may be used to enhance color toner Glossmark images across the low and high density areas of application where the differential gloss effect would otherwise be weak.

U.S. Pub. No. 20060044617, published Mar. 2, 2006, entitled REDUCTION OF DIFFERENTIAL GLOSS WITH HALFTONED CLEAR TONER, by Shen-Ge Wang, et al., discloses a method for reduction of differential gloss as found in halftone image hardcopy prints. The method includes selecting either a single halftone or employing two halftones: a first halftone having a high apparent gloss characteristic and a second halftone having a low apparent gloss characteristic. A determination is then made of which areas of the halftone image correspond to potentially high gloss and low gloss regions under normal printing conditions. An overlay of clear toner is applied to the hardcopy print of the halftone image.

U.S. Pub. No. 20060072159, published Apr. 6, 2006, entitled VARIABLE DATA DIFFERENTIAL GLOSS IMAGES, by Reiner Eschbach, et al., relates to the segmentation of an image into a main area and an image segment for variable data differential gloss image control. A method for variable data differential gloss image control includes selecting a single color, selecting a first halftone having a first anisotropic structure orientation, creating a first color definition comprising the single color and the first halftone, selecting a second halftone having a second anisotropic structure orientation different from that of the first halftone, creating a second color definition comprised of the single color and the second halftone, applying the first color definition to at least some portion of an image of interest, and applying the second color definition to the remaining portion of the image of interest to produce a variable data differential gloss image.

U.S. Pub. No. 20060127117, published Jun. 15, 2006, entitled USER INTERFACE FOR DIFFERENTIAL GLOSS IMAGES, by Reiner Eschbach, et al., discloses a user interface for the effective generation of differential gloss images. The user is instructed to indicate the base primary image data, and the desired gloss image data. This data may be displayed for verification and position adjustment by superimposition of the gloss image data upon the background image data. In an alternative, the placement information may be inferred from the position of originals upon the scanner or copier platen and the result may or may not be displayed. By selectively applying halftones with different anisotropic structure orientation characteristics to the base primary image data as directed by the desired gloss image data, a differential gloss image file or hardcopy may be provided.

BRIEF DESCRIPTION

In accordance with one aspect of the exemplary embodiment, a method for simulating a differential gloss image includes providing a background image and providing a gloss effect image. The gloss effect image is configured for controlling the selective application of first and second halftones to the background image for creation of a differential gloss image when the background image is printed. A mask is formed, based on the background image, in which regions of mid-tone gray level are accentuated. The gloss effect image is muted to form a muted gloss effect image. The mask is applied to the muted gloss effect image to generate a background modified muted gloss effect image. The background modified muted gloss effect image is applied to the background image to generate a representation of the differential gloss image.

In another aspect, a system for simulating a differential gloss image is provided. The system includes a preview image generator which executes instructions stored in associated memory for a) reading a background image and a gloss effect image, the gloss effect image being configured for controlling the selective application of first and second halftones to the background image for creation of a differential gloss image when the background image is printed, b) forming a mask based on the background image in which regions of mid-tone gray level are accentuated, c) applying an edge effect filter to the gloss effect image to form a filtered gloss effect image, d) applying the mask to the filtered gloss effect image to generate a background modified filtered gloss effect image, and e) applying the background modified filtered gloss effect image to the background image to generate a representation of the differential gloss image.

In another aspect, a method of simulating a differential gloss image includes providing a background image, forming a mask based on the background image which accentuates regions of mid-tone gray level, providing a binary gloss effect image configured for providing a differential gloss watermark in the background image when two different halftone structures are applied in accordance with the binary gloss effect image, applying the mask to image data derived from the binary gloss effect image to form a background modified gloss effect image, and applying the background modified gloss effect image to the background image to simulate the differential gloss image which would be generated if the two different halftone structures were to be applied in accordance with the binary gloss effect image, the simulation enabling a viewer to identify regions of the background image in which the differential gloss watermark would be more apparent than in other regions if the halftone structures were to be applied.

U.S. Pat. No. 5,734,752, issued Mar. 31, 1998, by Knox, discloses a method for generating watermarks in a digitally reproducible document which are substantially invisible when viewed. The method includes producing a first stochastic screen pattern suitable for reproducing a gray image on a document, deriving at least one stochastic screen description that is related to the first pattern, producing a document containing the first stochastic screen, producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

DETAILED DESCRIPTION

In aspects of the exemplary embodiment, a system and method for generating a representation of a GlossMark™ (differential gloss) image are provided. The representation simulates a differential gloss image which would appear if a digital image were to be printed on a substrate using anisotropic halftone structures and viewed at an off-axis angle. The representation allows regions of the image designated as being of differential gloss, such as a watermark, to be visually distinguishable from the background image, for example, when displayed on a screen or printed by a device which lacks a facility for generating a GlossMark image.

In various aspects, the representation takes into account the gray level of the region of the background image in which the watermark is placed. Herein, gray level refers to increasing intensity for any channel, irrespective of whether it is a monochrome or a color channel. For example, the watermark in the simulated image may have an appearance characteristic which varies as the gray level varies, e.g., as the gray level of the background image increases or decreases from an intermediate gray level. Thus in those regions of the image which are at or close to the minimum and maximum gray levels, the representation of the watermark may be diminished in the appearance characteristic to emphasize that it would be less visible in the corresponding regions of the actual differential gloss image.

The appearance characteristic may comprise, for example, one or more of a level of contrast between the watermark and the surrounding background image, an intensity (gray level) of the watermark, a color of the watermark, or other appearance characteristic whereby the gloss differential may be simulated. As will be appreciated, the representation generated by the exemplary method only simulates a differential gloss image, it does not actually provide differential gloss in regions of an image of equal gray level, either as viewed on screen or in a printed image. It thus differs from a printed differential gloss image.

Figure 1:
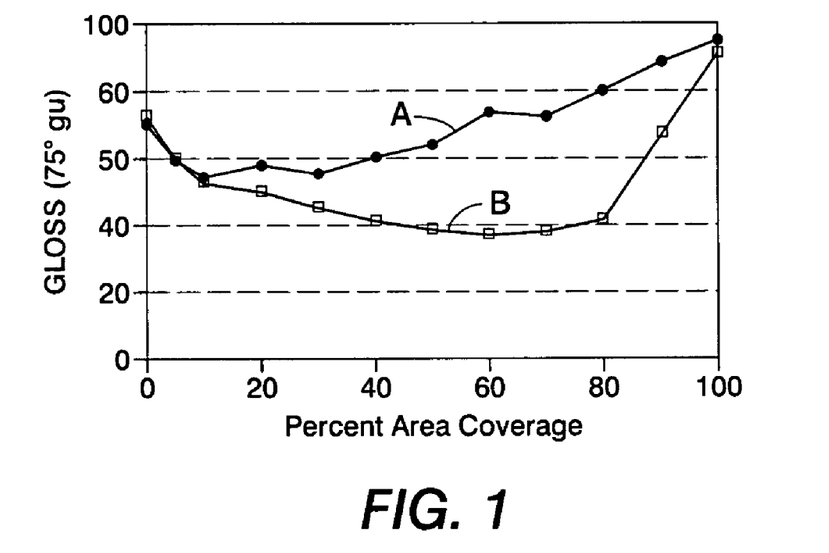
FIG. 1 is a plot of measured gloss in an exemplary printed image vs. area coverage for a pair of orthogonal line screens which generate anisotropic halftone structures.
Figure 2:
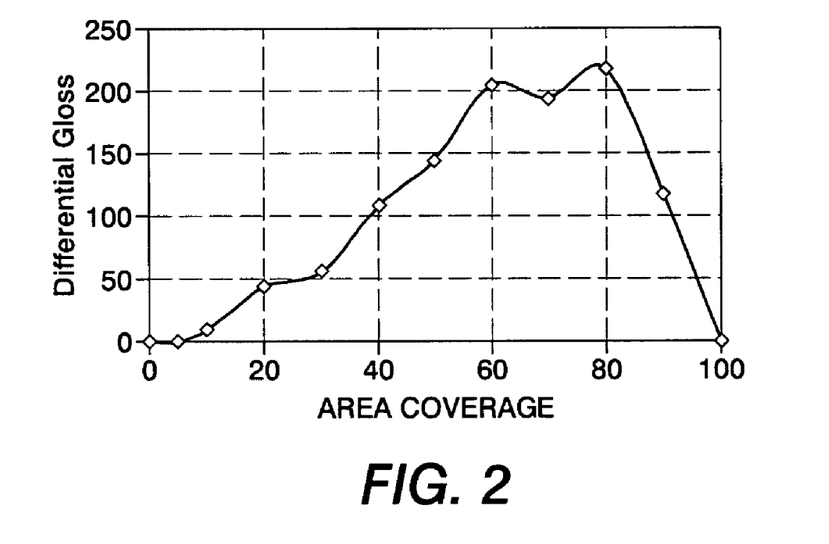
FIG. 2 is a plot of differential gloss vs. area coverage for the printed image based on the gloss measurements of FIG. 1 by subtracting the lower curve from the upper curve and smoothing the results.

By way of example, FIG. 1 is a plot of the variation in gloss of a printed image (measured in gloss units, gu, at 75 degrees from normal) with area coverage, for first and second matched anisotropic halftone structures, labeled A and B, respectively. The area coverage corresponds roughly to the gray level, with 0% corresponding to a white image and 100% to a completely black image. FIG. 2 is a plot of the differential gloss vs. area coverage, where differential gloss is a function of the difference between the two plots shown in FIG. 1. As can be seen from FIG. 2, the gloss differential is most apparent between about 40% and 90% coverage, the peak differential being between about 60 and 90% coverage.

The simulated differential gloss image may be used in a differential gloss image creation workflow as a preview image for display on a computer screen in order to indicate how a gloss effect image lines up spatially with a background (base) image. The simulated differential gloss image may also be placed in an applications document as a low-resolution placeholder image as a reference to the created GlossMark image. The placeholder image allows proofing for size, color, and placement both in the applications program and on simple prints from non-GlossMark-enabled printers. While particular reference is made herein to the representation as being a preview image to be displayed on a screen, it is to be appreciated that placeholder images may be similarly created, optionally with minor modifications to the method, as noted below.

Techniques for generating differential gloss patterns in printed images which may be utilized herein are described, for example, in above-mentioned U.S. Pat. Nos. 7,092,128, 7,126,721, and 7,148,999, and in Publication Nos. 20030231349, 20040000786, 20040114160, 20050128523, 20050128524, 20060072159, 20060127117, incorporated herein by reference. A digital image which has been halftoned includes binary image data, for one or more color channels. In the case of a monochrome image, the image data may be for a single color channel, such as a black channel. In the case of a color image, image data for up to four (or more) channels, such as cyan, magenta, yellow and optionally black channels may be provided.

In a differential gloss image, as used herein, a plurality of different screens may be used in forming a halftoned binary image. The screens may generate halftone structures with similar sizes and shapes but different polarization directions. By toggling between the halftone screens in generating the halftone image, differences in gloss are apparent when the rendered image is viewed at an angle. The embedded gloss pattern created by this process may be a text, logo, or other shape. In the case of a color image, the same pattern may be embedded into each of the color channels (CMYK), such that when rendered, the differential gloss patterns are substantially in superimposition one on top of the other in the printed image.

A printer, as used herein can include any device for rendering an image on print media, such as a printer, bookmaking machine, or a multifunction machine having copying and/or faxing as well as printing capability. Print media can be a usually flimsy physical sheet of paper, plastic, or other suitable physical print media substrate for images. An image generally may include information in electronic form which is to be rendered on the print media by the printer and may include text, graphics, pictures, and the like. The operation of applying images to print media, for example, graphics, text, photographs, etc., is generally referred to herein as printing. While in the exemplary embodiment, the printer is described in terms of a xerographic printer, it is also contemplated that the printer may incorporate inkjet or other marking technology.

A watermark can comprise any regular or irregular shaped region or combination of regions, the region or regions having a different gloss characteristic from an abutting region of the image. Exemplary watermarks include indicia, logos, trademarks, bar codes, date/time stamps, monetary values, serial numbers, tracking numbers, program codes, and repeating patterns of visually discernable shapes, although the variety of watermarks is not limited to these types.

The differential gloss images have a variety of applications including providing an indicia which serves as a security feature in a document, as described, for example, in U.S. Pat. No. 7,126,721, providing variable information, as described, for example, in U.S. Pat. No. 7,148,999, as a logo, a trademark, a bar code, a monetary value, a serial number, a program code, or as a decoration, such as for a greeting card, gift wrap, wallpaper, or the like. The printed substrate comprising the image may be a coupon, ticket, certificate, passport, award, banknote, diploma, decorative item, or other document. The differential gloss watermarks may be utilized, for example, to provide security information for a ticket, coupon, or the like, to provide an indicia as to the source of the image, to provide personalized information in mass mailings, or to provide time varying information, such as a date on which the image is printed, or the like.

The halftone screens used in generating the differential gloss patterns have different anisotropic structure orientations provided by differences in dot growth patterns. Typically, the halftone structures (clusters) generated by the screens have similar sizes and shapes (for a given gray level) but different polarization directions. In one embodiment, the anisotropic structures provided by the halftone screens are mirror images (for the same gray level).

The diffuse light and incident light for the two halftone structures at orthogonal angles to the paper are typically equal. In this way, the light which is available to a scanner or to the human eye from directly above is the same. However, the specular reflected light is considerably greater for one of the anisotropic orientations at a given off-normal angle. If as printed, a mass of the first orientation halftones are butted directly adjacent to a mass of the second orientation halftones, there will be a difference in reflected light between them, which when viewed from an angle will be perceived as a shift in gloss differential or a GlossMark image. Similarly, if as printed, a mass of the first (or second) orientation halftones is butted up against a mass of halftones of mixed anisotropy, there will also be a difference in reflected light between them, which when viewed from an angle will be perceived as a shift in gloss.

The perceptibility of this gloss differential is generally maximized when the halftone anisotropic orientations are, 90 degrees apart. In practice, this is typically provided by screens at +45° and −45° from the process (slow scan) direction. For each dot location, the screen may comprise a grid of cells (pixels), each of which may be on or off. The dot may grow, with increasing gray level, from a single cell or from multiple cells. It will be appreciated that the anisotropy is most apparent at intermediate (mid-tone) gray levels where at least some but not all the cells are turned on. At high or low gray levels, where all or none of the cells are turned on, the anisotropy is diminished or absent.

Figure 3:
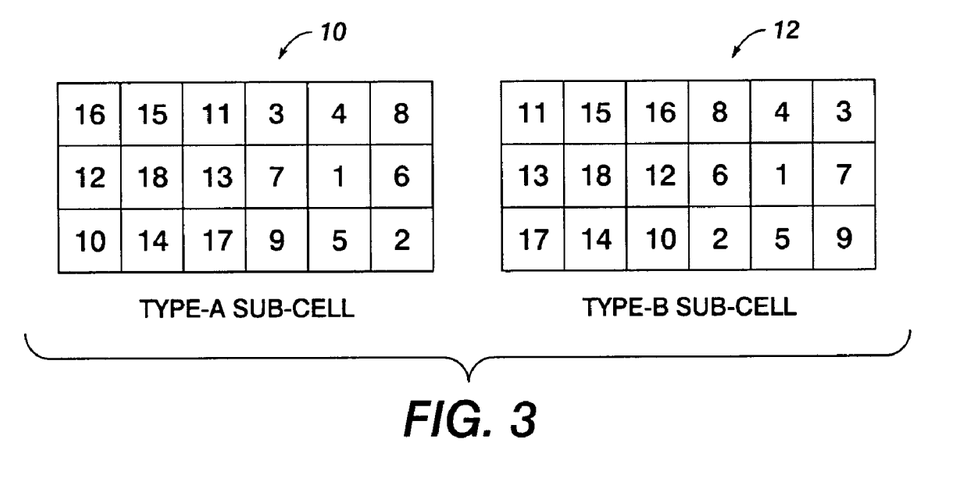
FIG. 3 illustrates exemplary anisotropic halftone screens for creation of differential gloss images.

In one embodiment, the cell growth may be as illustrated in FIG. 3, which shows the order in which pixels are switched on for an exemplary 3×6 sub-cell. The type-A sub-cell 10 and type-B sub-cell 12 both have a 45 degree orientation, one to the right and the other to the left. This orientation can be clearly seen in the density. To maximize the perceptibility of the gloss differential, the orientations of sub-cells type-A and type-B are arranged at 90 degrees one from the other. However, the exemplary method is not limited to the sub-cells shown and is suited to the creation of differential gloss images where the halftone structures of at least one of the color channels in an image exhibit at least some degree of anisotropy.

Figure 4:
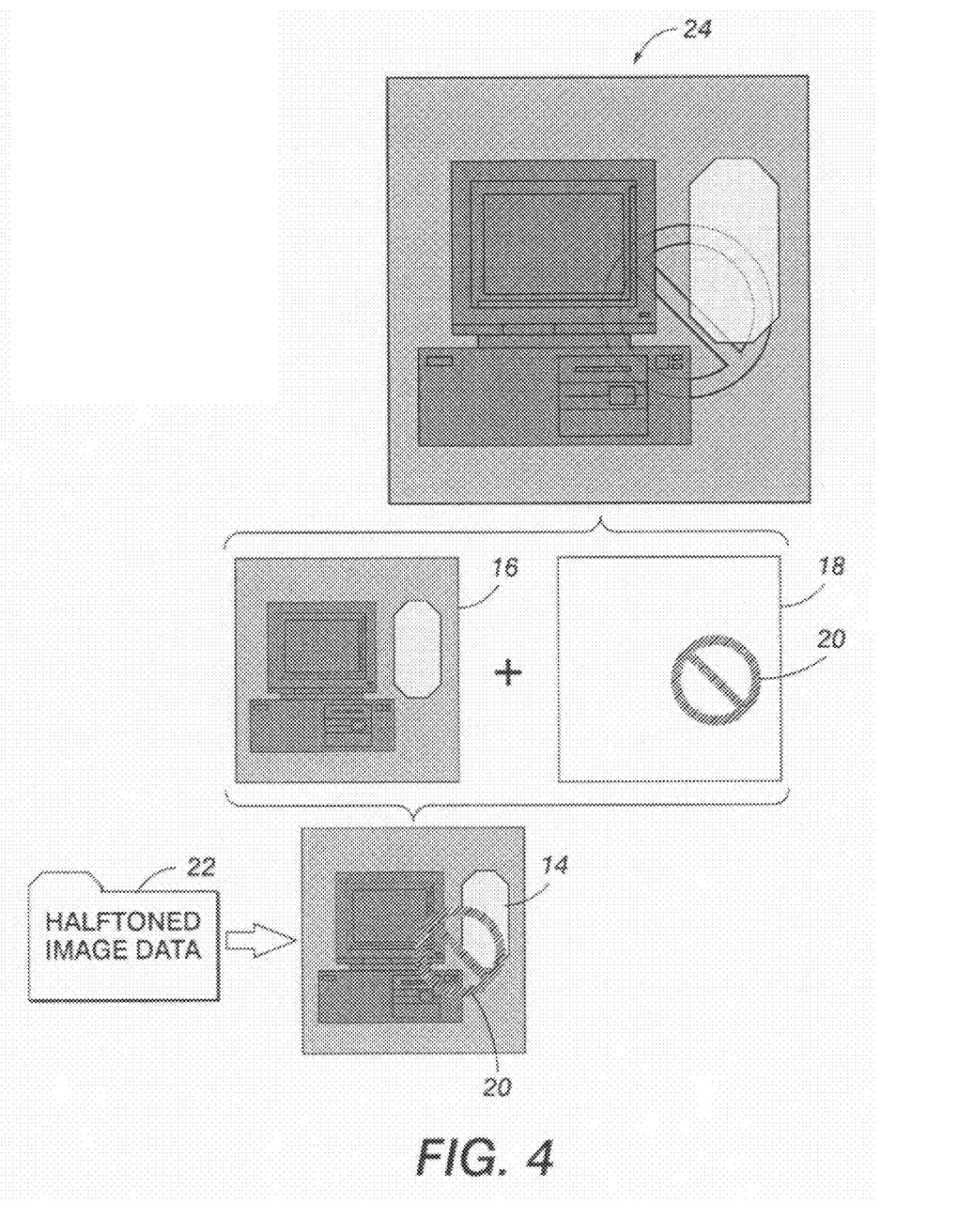
FIG. 4 is a schematic illustration of the creation of differential gloss and preview images based on background and gloss effect images.

FIG. 4 depicts the creation of a GlossMark image 14 achievable using halftone sub-cells as described above. A background (base) image 16 and a gloss effect image or mask 18 are combined by screening the background image (or a first region) with a first of the screens, such as screen 10 except for a second region or regions 20 corresponding to a differential gloss pattern or "watermark," which is screened with a second of the halftone screens 12. The resulting image 14 is a patchwork of the halftones created by the two screens 10, 12.

In order to create the exemplary GlossMark™ images, a background image file and a GlossMark file or mask are generally employed. The background image file is the "normal" image that is seen when casually looking at the print. It serves as the background over which the intended gloss image is located. This image can be created in or be the result of any appropriate image manipulation application, such as for example Adobe PhotoShop™. This image forms the base for the GlossMark™ image and should have a sufficient image area in the mid-tones so that the desired differential gloss image will be visible. The background image file may be of a continuous tone or contone nature. A second file includes the intended or desired watermark. This file or files encapsulates the actual gloss image that is to be placed over the background image and thus is intended to be visible as a differential gloss image in the hardcopy output. The second file may be of a binary image data type, meaning that only "black" and "white", or "zero" and "one" pixel values are allowed. This can be achieved, for example, by using "Image→Mode→Bitmap" commands in PhotoShop™ or by any other image manipulation software using the appropriate commands to create a binary representation. The desired gloss image file may also have its resolution adjusted to match up with the background image data if so needed.

As noted above, in differential gloss images, the visual effect is only present on the final printed document, and then only with specific lighting conditions. Because the effect is created by microscopic high-resolution printed texture patterns, it cannot be seen on a computer screen, or on a sub-sampled lower-resolution image.

In various aspects, the exemplary method allows the generation of a preview image 24 (FIG. 4) in a manner which simulates the visual gloss effect. Specifically, the simulation shows the shape and location of a watermark. The exemplary method also predicts the strength of the gloss effect throughout the dynamic range of a background image. In one aspect, this may be accomplished by changing a binary watermark image into a strongly edge-enhanced effect of only a few pixels of outline. The edge effect image is then modulated by a calibrated function of the background color values before it is combined with the background image. The resulting preview image 24 thus includes a simulated watermark 26 having an appearance characteristic which varies with the gray level of the background image and is limited to an edge region of the original watermark.

Figure 5:
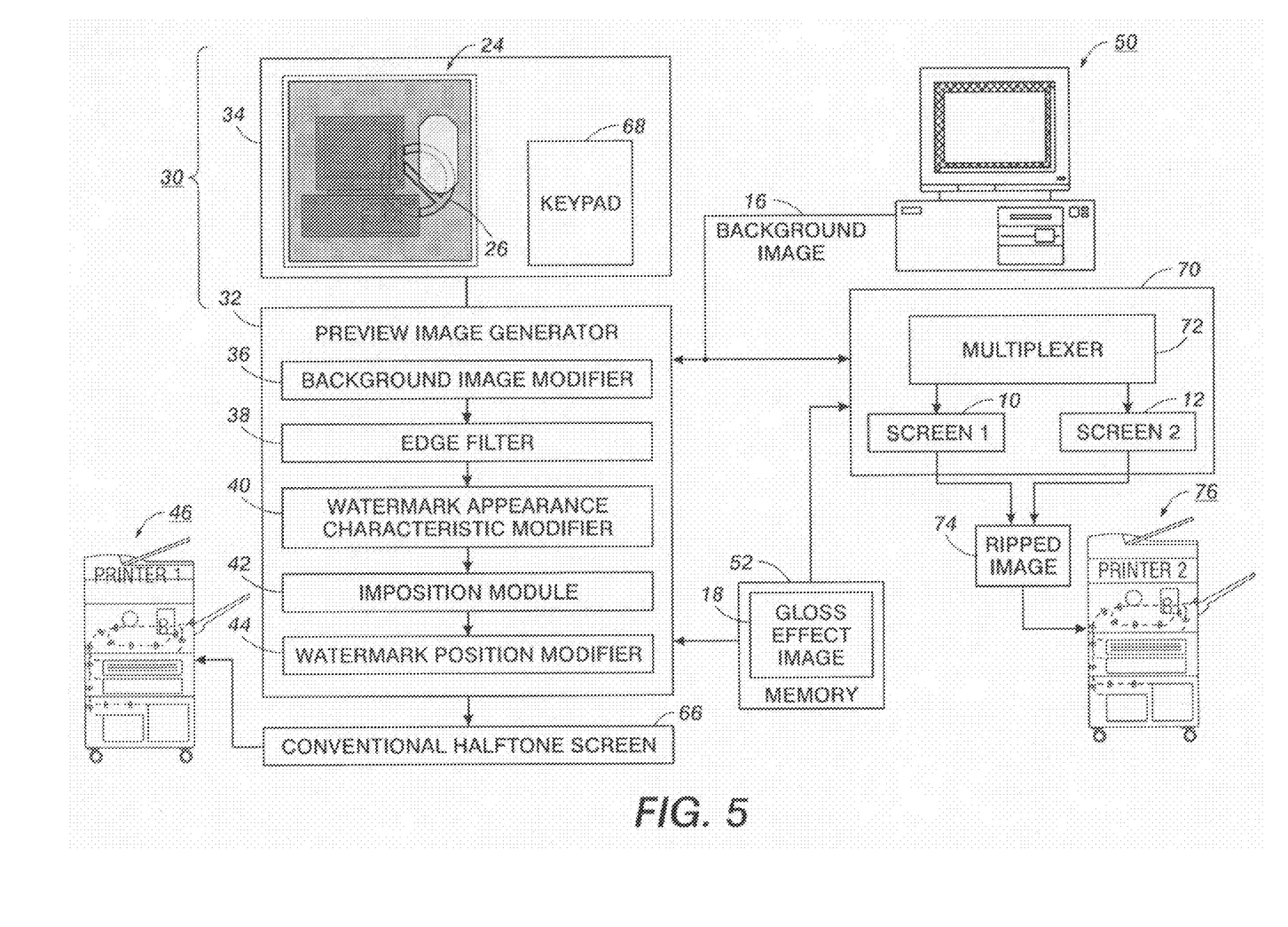
FIG. 5 is a functional block diagram of an exemplary environment in which a system for creation of a representation which simulates a differential gloss image operates.

With reference to FIG. 5, a functional block diagram of an environment in which a system 30 for simulating a differential gloss image operates, is shown. The exemplary system 30 includes a preview image generator 32 and may further include a display 34, such as a computer monitor with a screen, in communication with the preview image generator 32, for displaying a generated preview image 24. The preview image generator 32 is illustrated as including several processing modules 36, 38, 40, 42, 44, whose functions will be described in greater detail below. The modules operate on background image 16 and gloss effect image 18 to produce a simulated watermark 26 which can be applied to the background image 16 to form the preview image 24. The preview image 24 may be displayed on the display screen 34, appended to a document, or printed on a printer which lacks the facility for generation of differential gloss images.

A primary image 16 may be received as input data to the preview image generator 32. For example, the background image 16 may be transferred from a remote workstation 50 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. The primary image data may include image data for one or more color channels, e.g., in a portable document format (PDF) such as JPG, or other image data file format, such as TIFF, DIF, BMP, or PNG.

A desired gloss effect image 18 is also received as input data to the preview image generator 32. In one embodiment, the gloss effect image 18 does not include color data but merely identifies the region or regions which are to be half-toned with a different screen or screens than for the base image. The gloss effect image 18 may be stored in memory 52, along with the input background image 16. Alternatively, the gloss effect image 18 may be received in a file along with the incoming primary image data 16.

The background image modifier 36 of the preview image generator 32 generates a modified background image based on the original background image 16. An exemplary modified background image or mask 60 is illustrated in FIG. 5. The exemplary modified background image 60 may be a monochrome (single channel) image which highlights those regions of the background image where the watermark will be most clearly visible in an actual differential gloss image, i.e., the regions of mid-tone gray level.

The edge effect filter 38 generates an edge-filtered gloss effect image 62, based on the input gloss effect image 18. In the filtered image 62, only a few pixels which define the edge of the watermark are apparent. This mutes the appearance of the gloss effect image 18 for purposes of the preview. Alternatively, the gloss effect image may be muted in another suitable predefined manner so that, in the preview it has less impact on the background image.

The watermark appearance characteristic modifier 40 generates a modified gloss effect image 64 by applying the gloss modifier mask 60 to the edge-filtered gloss effect image 62.

The imposition module 42 applies the modified effect image 64 to the original background image 16 (which may have been suitably formatted for display purposes) to form a preview image 24. The preview image 24 may be rendered on an image rendering device such as by being displayed on screen 34 or printed on printer 46. In the case of a printed image, this may entail halftone screening the preview image with a conventional halftone screen 66 to provide binary data for printing.

A user may interact with the watermark position modifier 44 of the preview image generator 32 via a user input device 68, such as a keypad, keyboard, joystick, mouse, touch screen, or combination thereof. In this way, the user may elect to change the position or other features of the watermark 26 in the gloss effect image 18 to render it more readily visible. If the position of the watermark is moved, the preview image generator 32 may generate a new preview image for display. The watermark's appearance may thus change due to the differences in grey level in the background image at the original and new locations of the watermark.

In one embodiment, the user interacts via a graphical user interface of the type described in Published Application No. 20060127117, incorporated by reference. Such a GUI may include a file chooser for selecting a background image 16 and a file chooser for the gloss pattern 18. Both files can be displayed in the GUI, thus enabling a quick verification of the desired layout. A representation 24 can also be displayed. This means that the GUI does not represent the actual changes made to the background image during printing, as would be the normal approach to a GUI, but that instead it represents a placeholder.

The preview image generator 32 may be embodied in a computing device, such as a general purpose computer, e.g., a desktop, laptop, palm device, or the like, or a dedicated computing device, for example, in the digital front end of a printer. The preview image generator 32 may be a plug-in software component or hardware component. As will be appreciated, the modules 36, 38, 40, 42, 44 may be combined into a single processing component 32 or distributed in two or more processing components.

The printer 46 may include a marking engine for rendering a halftoned preview image on a tangible substrate such as print media. As known in the art, such devices include the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which may include a cleaning device, a charging station for each of the colors to be applied (one in the case of a monochrome printer, four in the case of a CMYK printer), such as a charging corotron, an exposure station, which forms a latent image on the photoreceptor, a developer unit, associated with each charging station for developing the latent image formed on the surface of the photoreceptor by applying a toner to obtain a toner image, a transferring unit, such as a transfer corotron, which transfers the toner image thus formed to the surface of the print media substrate, and a fuser, which fuses the image to the sheet. The fuser generally applies at least one of heat and pressure to the sheet to physically attach the toner and optionally to provide gloss to the printed media.

While particular reference is made to electrophotographic (e.g., xerographic) printers, suitable marking engines may also include ink-jet printers, including solid ink printers, thermal head printers that are used in conjunction with heat sensitive paper, and other devices capable of marking an image on a substrate. It is to be appreciated that the marking engine can include an input/output interface, a memory, a marking cartridge platform, a marking driver, a function switch, a controller and a self-diagnostic unit, all of which can be interconnected by a data/control bus.

When the user is satisfied that the gloss effect image is correctly placed and or sized and shaped for the selected background image 16, the user may elect to generate a differential gloss image. In this case, an applying component 70, which in the exemplary embodiment comprises a multiplexer switch 72, selectively actuates the first and second anisotropic halftone screens 10, 12 according to the region of the image as designated by the image data in the original gloss effect image 18 to screen the background image data 16. The raster input processed (RIPed) image 74 thus formed is sent to a printer 76 as a binary image produced by halftoning the primary image data 16. The printer 76 may be the same or a different printer from printer 36. In this way, a superimposition of a differential gloss pattern is embedded into the printed primary image 16 which can only be perceived as gloss differential.

Figure 7:
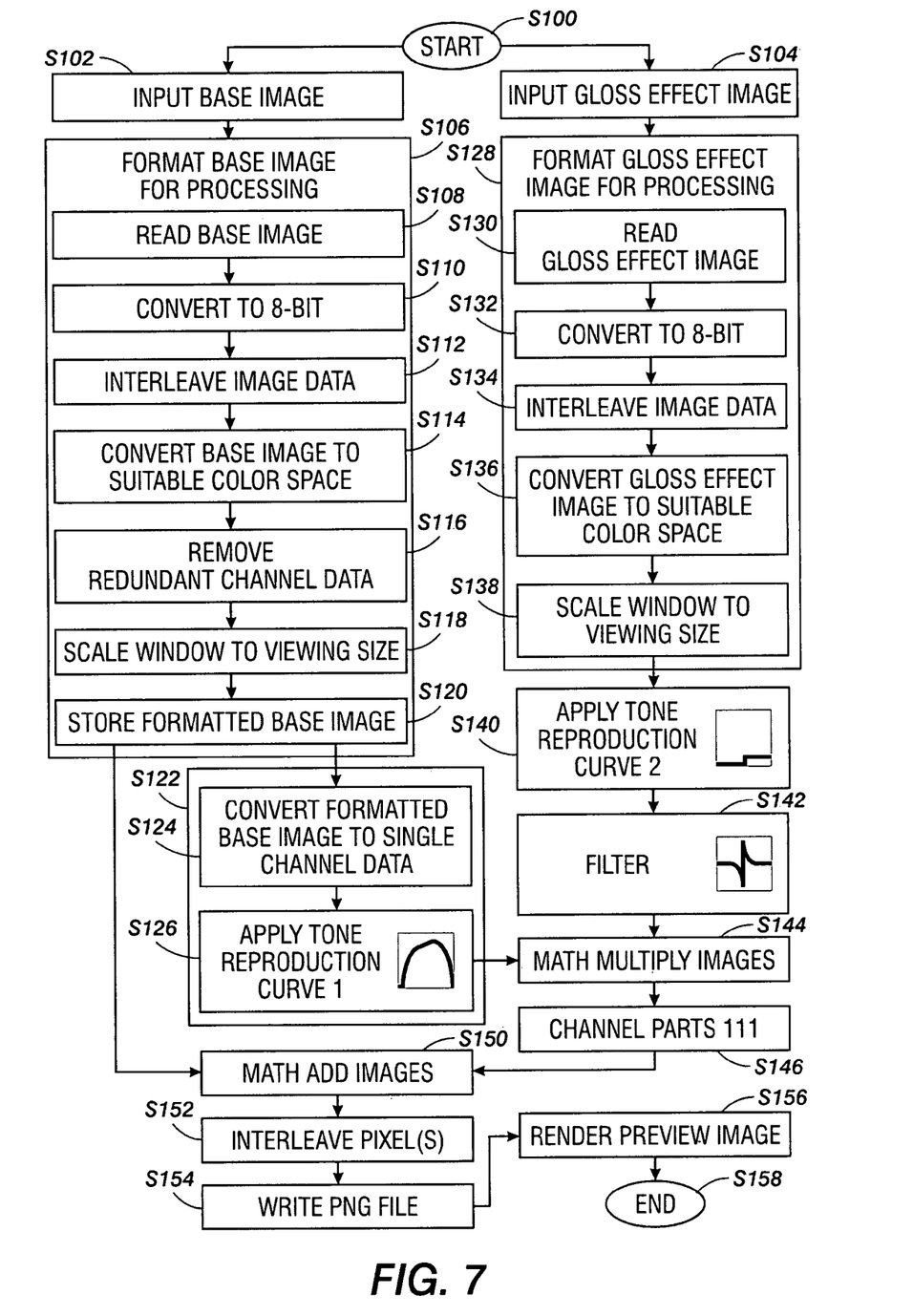
FIG. 7 is a flow chart which illustrates an exemplary method for simulating a differential gloss image.

FIG. 7 is a flow diagram which illustrates an exemplary method for generating a preview image 24, which may be performed with the system 30 of FIG. 5. As will be appreciated, the method may include fewer, more or different steps and need not be performed in the order illustrated. The flow diagram shows how the background image 16 and the gloss effect image 18 are separately processed and combined to create preview and placeholder images. The center section shows how the background image is passed through a calibrated inverted U-shaped TRC in order to correctly modify the gloss effect image. The right-hand section shows how the gloss effect image is first strongly modified by an edge-enhancement filter before it is multiplied by the modified background image, prior to being combined with the original background image.

The method begins at step S100. At S102, a base image 16 is input to preview image generator 32. As noted above, the base image may be a contone image in any suitable format for processing, such as JPG, TIFF, DIF, BMP, or the like. At S104, a gloss effect image 18 is input to the preview image generator. During processing, the base image 16, gloss effect image 18, and modified images generated therefrom, may be stored in memory 52.

At S106, the base image 16 may be formatted for processing. This step may include one or more substeps, such as reading the base image (S108) and converting the base image to a suitable resolution for processing, such as to an 8-bit image (S110). For creation of low-resolution placeholder images, lower than 8-bit resolution may be used. At S112, the base image data may interleaved scanwise and/or pixel wise. For example, image data relating to three color channels, such as red, green, and blue (RGB) color separations, may be interleaved such that each pixel is described with respect to the data for the three color separations. In another embodiment, each color separation may be treated independently in the following steps. Optionally, at step S114, the image data may be converted to a suitable color space for processing. In one embodiment, the color space is rgbLinear. An advantage of such a color space is that the color values for each pixel are independently described, which makes processing simpler than in a conventional JPG file. At step S116, the data may be filtered to remove any extraneous channel data. The resulting image has channel data for R, G, and B channels only. This step simplifies processing by allowing the preview generator 32 to ignore secondary embedded images, such as those in alpha or omega channels, which are often incorporated into JPG images. At step S118, the base image, as modified by the prior steps, may be scaled to a suitable size for subsequent viewing on the display. This step may be omitted in the case of a preview image which is to be printed rather than being displayed. The resulting formatted background image 16 may be stored in memory at step S120.

At S122, the formatted background image which is output at the end of S106 is used to create a gloss modifier mask 60. This step may include substeps S124 and S126. At step S124, the three channel image data is converted to a color space having a single channel, such as grayLinear. This has the effect of converting the color image to a black and white image. Various methods are known for performing such a conversion. In general, the gray level output for each pixel is a weighted sum of the colorant values for the three channels R, G, B. For example, a sum of 60% of the green, 30% of the red, and 10% of the blue channel values may be utilized to generate gray level (luminance) values for each pixel. This step may be omitted if the channel data for the three channels R, G, B are separately processed.

At S126, the monochrome data generated at S122 is manipulated to accentuate mid-tone gray levels. In the exemplary embodiment, this results in gray levels which are intermediate the high and low values being raised, as compared with their original values. For example, a tone reproduction curve (TRC1) is applied which weights the mid-tone values more heavily than the values at the white and black ends of the scale. The output of this step is the gloss modifier mask 60. In the illustrated mask 60, darker tone (high gray level) areas represent the areas of mid-tone gray levels in the original image. The gloss modifier mask 60 serves to predict which regions of the image are best suited for placement of a watermark.

TRC1 may be based on the measured gloss for the two perpendicular line screens shown in FIG. 1. The differential gloss from this data, shown in FIG. 2, may be used to calibrate TRC1. The data of these FIGURES may be smoothed prior to generating the TRC1, to take out some of the scatter in the results. As will be appreciated, the measured gloss values depend, to some degree on the natural gloss of the substrate and the inks used in rendering the image. Accordingly, it is not necessary for TRC1 to match exactly the shape of a particular differential gloss curve. In general, a TRC which renders the gloss effect image more apparent in the mid-tone gray levels of the background image and less apparent at high and low gray levels can be used as TRC1 to generate a satisfactory mask 60 in the exemplary method. TRC1, and other TRCs shown in FIG. 7, have the input gray level on the x axis and output gray level on the y axis.

At S128, the gloss effect image may be formatted for processing. This step may include similar substeps to those previously outlined for the base image 16. At S130, the input image 18 is read. At S132, the gloss effect image may be converted to a suitable resolution, generally the same resolution as the base image, such as to an 8-bit image. At S134, the image data may be interleaved, such that the appropriate color value is identified with each pixel. At this stage, each pixel generally has either a value of 0 or 255 (on an 8-bit scale), representing white and black, respectively. At S136, the image data thus generated may be converted to a suitable color space for processing, such as grayLinear. At S138, the gloss effect image may be scaled to match the window size of the base image. As with corresponding step S118, this step may be omitted where the preview image is to be printed rather than displayed.

As will be appreciated, the formatting steps S106, S128 may be performed contemporaneously or in a different order from that described above.

At S140, the binary values of the gloss effect image, which may up to this point be represented by 0 and 255 on an 8-bit scale, may be converted to values better suited to edge effect filtering. For example, the high (black) values may be converted to a value which is closer to the low (white value), such as a value of 2 or 3, by applying a two step tone reproduction curve TRC2 to the image data. For some edge effect filters, such a step may not be necessary.

Figure 8:
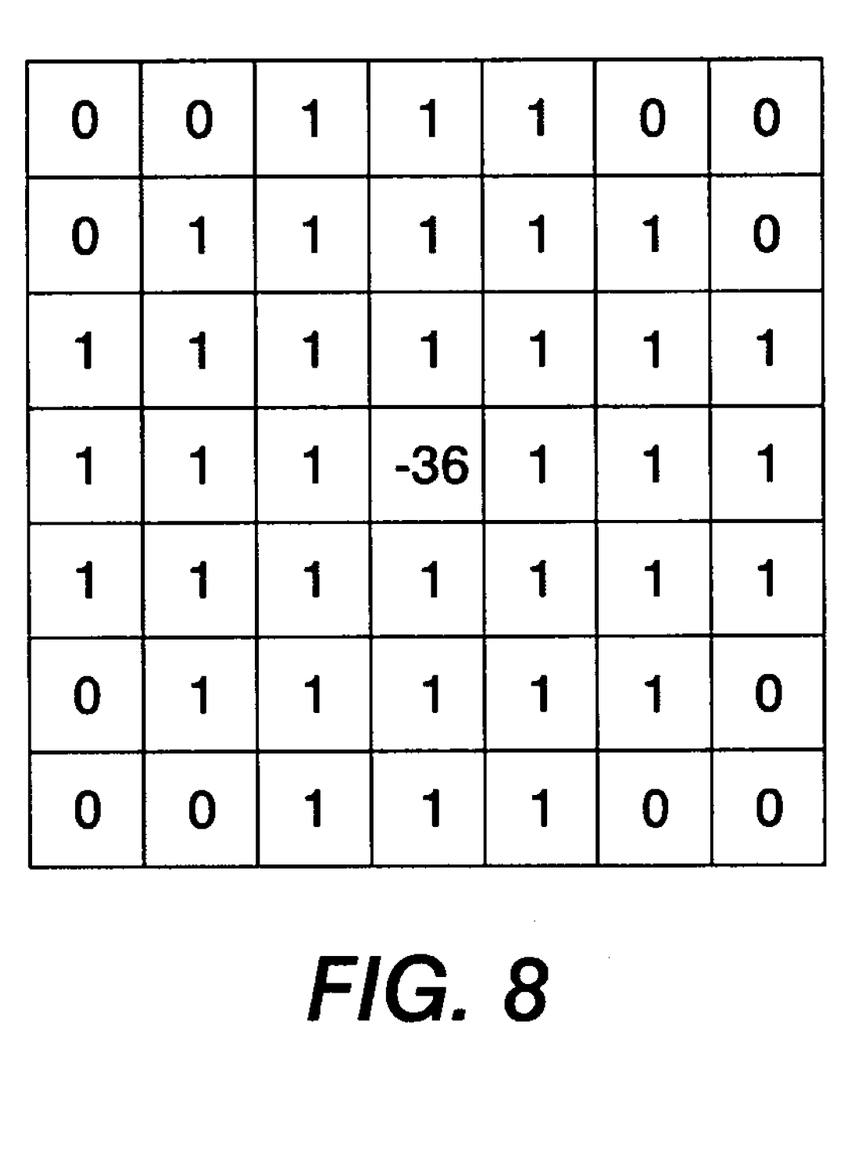
FIG. 8 illustrates an exemplary edge effect filter.

At S142 an edge effect filter is applied to the gloss effect image data. The edge effect filter may be one which swings quickly from black (positive) to white (negative), or vice versa, at high contrast regions of the gloss effect image. An example of such an edge sharpening filter is shown in FIG. 8. This 7×7 filter produces an edge effect that spans ±3 pixels and is appropriate for the place-holder image that can be printed on a non-gloss-enabled printer. A similar but smaller 5×5 or 3×3 filter can be used for a lower-resolution preview image which is used for the computer display.

The resulting gloss effect image 62 is thus apparent only at the edges of the original watermark. The remainder of the image 62 is of a consistent, midtone gray level (e.g., represented by a value of 0). This mutes the effect of the gloss effect image. The severity of the edge effect filter may be selected to provide about a three pixel width perimeter at the edges of the watermark.

Alternatively, at S140, other methods for muting the appearance of the watermark in a uniform manner, while retaining its visibility, may be applied.

Figure 6:
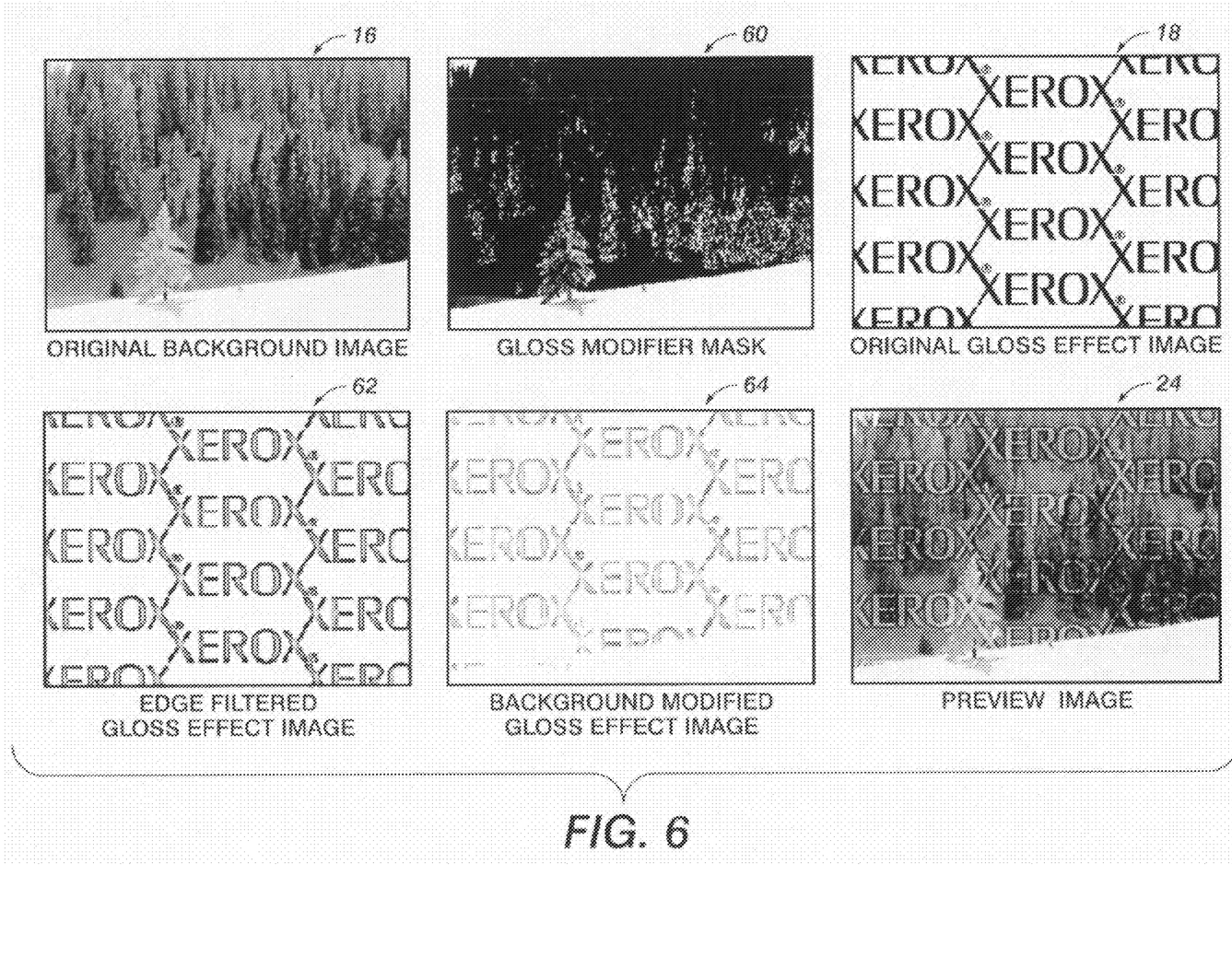
FIG. 6 illustrates graphically, images used in the exemplary method including an original background image, a modified background image based on the background image, an original gloss effect image, the gloss effect image converted to an edge effect, the edge effect modulated by the modified background image, and the combined final preview image.

At S144, the modified background mask 60 is applied to the edge filtered gloss effect image 62 to provide a background modified gloss effect image 64. This step may be performed by multiplying the gray level in the mask 60 with the corresponding grey level in the edge filtered image 62 for each pixel. As can be seen from FIG. 6, this step renders the edge filtered gloss effect image more apparent in regions corresponding to the mid tones of the original background image than in regions of high or low values. For example, in the region at the bottom right of the image 64, corresponding to a region of white snow in the background image, the gloss effect image has been completely removed.

At S146, the image 64 may be used to create a mask for each of the three color channels, R, G, B. The same mask may thus be used for each of the color channels in this embodiment. In the alternative embodiment, where each color channel of the background image is treated separately, the output of S144 is a mask 64 for each of the channels R, G, and B, which may thus be different from each other.

At step S150, the original background image is modified by the mask 64 to provide a preview image 24. In this step, the edge filtered, background modified gloss effect image 64 for each color channel is applied to the image data for the respective channel of the original background image 16 (e.g., the image stored in step S120). This step may include adding the gray value of the background image to the corresponding gray value of the mask 64 for each pixel. For most pixels of the background image, this results in the image data being unchanged. In the edge regions of the watermark, the three pixel region is shown as a contrast to the adjacent pixels. For example, three edge pixels in a scan line may have an average gray level which matches the gray level of the adjacent pixels in the image. However, the edge pixels are of contrasting gray level to the surrounding pixels, e.g., the middle edge pixel has a gray level which is higher or lower than that of the other two edge pixels.

As will be appreciated, at S150 other appearance characteristics of the background image may be additionally or alternatively modified in accordance with mask 64, such as shifting the base image brightness, shifting the base image contrast, and/or shifting the base image color values.

At S152, the image data thus created may be written to a file in a suitable format for its intended subsequent use. For example, when the preview image 24 is to be displayed, it may be stored as a PNG file. JPG, or other image data file formats, such as TIFF, DIF, BMP, are also contemplated.

At S154, the preview image 24 may be displayed on display 34. In some embodiments, the image 24 may be stored or printed on printer 36. The method ends at S156.

The predictive preview image 24 thus formed has advantages over a conventional preview image in which the gloss effect image is shown as a uniform color throughout. In the exemplary method, the gloss effect image has been changed to an outline effect where the outline is only a few pixels in width. The true colors of the background image are shown both inside and outside of the outlines of the gloss effect image. The simulated effect is rolled-off in both the highlights and the shadows similarly to the actual GlossMark print. This is a better simulation of the print because in an actual GlossMark, the edges of the gloss effect image are the most apparent aspect of the print as the print is tilted in the light, and when the print is viewed head-on, there is no apparent change in color related to the effect image.

The exemplary method shown in FIG. 7 may be utilized for generation of both preview and placeholder images. In the case of an image suitable for display, the method may include generating low resolution versions of the base image and gloss effect images. For a low resolution image, the edge effect filter used in step S142 may be somewhat less severe, to provide a more clearly distinguished edge.

The steps of the method illustrated in FIG. 7 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

I claim:

1. A method of simulating a differential gloss image comprising:
   providing a background image with a preview image generator;
   providing a gloss effect image, the gloss effect image being configured for controlling the selective application of first and second halftones to the background image for creation of a differential gloss image when the background image is printed;
   with a preview image generator, forming a mask based on the background image in which regions of mid-tone gray level are accentuated;
   muting the gloss effect image to form a muted gloss effect image;
   applying the mask to the muted gloss effect image to generate a background modified muted gloss effect image; and
   applying the background modified muted gloss effect image to the background image to generate a representation of the differential gloss image.

2. The method of claim 1, wherein the forming of the mask comprises applying a tone reproduction curve to image data derived from the background image.

3. The method of claim 2, wherein the tone reproduction curve has an inverted U shape in which mid-tone gray levels are weighted more heavily than high and low gray levels.

4. The method claim 1, wherein the muting the gloss effect image comprises applying an edge effect filter to the gloss effect image to form a filtered gloss effect image.

5. The method of claim 1, wherein the background image comprises image data for a plurality of color channels and the method further comprises converting the image data for the plurality of color channels to single channel image data.

6. The method of claim 5, wherein the forming of the mask comprises applying a tone reproduction curve to the single channel image data.

7. The method of claim 1, wherein the background image comprises image data for a plurality of color channels and the forming of the mask comprises applying a tone reproduction curve to image data derived from the background image for each of the plurality of color channels.

8. The method of claim 7, wherein the applying of the mask to the muted gloss effect image comprises, for each of the plurality of color channels, applying the respective mask to an edge filtered gloss effect image to generate a background modified filtered gloss effect image.

9. The method of claim 8, wherein the applying of the background modified filtered gloss effect image to the background image to generate a representation of the differential gloss image comprises, for each of the plurality of color channels, applying the respective background modified filtered gloss effect image to image data of the respective channel of the background image to generate modified image data for the respective channel and combining the image data for the plurality of channels to form the representation of the differential gloss image.

10. The method of claim 1, wherein the muted gloss effect image accentuates high contrast regions of the gloss effect image.

11. The method of claim 1, wherein the applying the background modified muted gloss effect image to the background image comprises for a pixel of the background image, summing a gray level of at least one color channel with a gray level of an equivalent pixel of the background modified muted gloss effect image.

12. The method of claim 1, wherein the gloss effect image is a binary image in which all pixels have either a first value or a second value.

13. The method of claim 1, further comprising converting at least one of the background image and gloss effect image to a common resolution.

14. The method of claim 1, wherein the representation comprises at least one of a preview image and a placeholder image.

15. The method of claim 1, further comprising displaying the representation as an image on a display, whereby an outline of the gloss effect image is most clearly visible in regions of the background image of intermediate gray level.

16. The method of claim 1, further comprising printing the representation.

17. A tangible computer readable program product which includes instructions, which when executed on a computer, perform a method comprising:
   based on a provided background image, forming a mask in which regions of mid-tone gray level are accentuated;
   for a provided gloss effect image configured for controlling the selective application of first and second halftones to the background image for creation of a differential gloss image when the background image is printed, muting the provided gloss effect image to form a muted gloss effect image;
   applying the mask to the muted gloss effect image to generate a background modified muted gloss effect image; and
   applying the background modified muted gloss effect image to the background image to generate a representation of the differential gloss image.

18. A representation formed by the method of claim 1.

19. A system for simulating a differential gloss image comprising:
   a preview image generator which executes instructions stored in associated memory for:
      reading a background image and a gloss effect image, the gloss effect image being configured for controlling the selective application of first and second halftones to the background image for creation of a differential gloss image when the background image is printed;
      forming a mask based on the background image in which regions of mid-tone gray level are accentuated;

applying an edge effect filter to the gloss effect image to form a filtered gloss effect image;

applying the mask to the filtered gloss effect image to generate a background modified filtered gloss effect image; and applying the background modified filtered gloss effect image to the background image to generate a representation of the differential gloss image.

20. The system of claim 19, further comprising a display, in communication with the preview image generator, for displaying the representation, whereby an outline of the gloss effect image is most clearly visible in regions of the background image of intermediate gray level.

21. A method of simulating a differential gloss image comprising:

providing a background image with a preview image generator;

forming a mask based on the background image which accentuates regions of mid-tone gray level;

providing a binary gloss effect image configured for providing a differential gloss watermark in the background image when two different halftone structures are applied in accordance with the binary gloss effect image;

applying the mask to image data derived from the binary gloss effect image to form a background modified gloss effect image; and with a preview image generator, applying the background modified gloss effect image to the background image to simulate the differential gloss image which would be generated if the two different halftone structures were to be applied in accordance with the binary gloss effect image, the simulation enabling a viewer to identify regions of the background image in which the differential gloss watermark would be more apparent than in other regions if the halftone structures were to be applied.

* * * * *